Patented Aug. 11, 1936

2,050,460

UNITED STATES PATENT OFFICE 2,050,460

PROCESS FOR ENRICHING STEELS IN SILICON

René Perrin, Paris, France, assignor to Société d'Electrochimie, d'Electrometallurgie et des Aciéries Electriques d'Ugine, Paris, France, a corporation of France No Drawing. Application October 5, 1934, Serial No. 747,077. In France October 9, 1933

2 Claims. (Cl. 75—133)

During experiments concerning the action upon steel of fused slags containing for instance about 50–60% of silica, the applicant has observed in certain cases a phenomenon of violent evolution of gas during the pour. If, for example, effervescent steel containing carbon with or without manganese, is poured upon a fused slag placed at the bottom of a ladle, the slag being of the above type and being subjected to conditions which will be stated below, the pouring being effected even without violence, it is observed that there is produced during pouring a gaseous evolution involving a violent agitation and a seething of the slag, which seething is the more pronounced the less fluid the slag. Slags of the above mentioned type are not in fact easily traversed by gases and therefor give rise in this case to much seething. There is produced at the same time an intense agitation at the surface of contact between the slag and the metal, and some metal is projected into the slag; in this way rapid partial reactions can be obtained between the metal and the slag due to this gaseous evolution. It is necessary in this case that the metal be not poured violently and rapidly, for if the pouring be rapid and violent slag and even metal may be expelled out of the ladle by the violent reaction which takes place.

The applicant has made studies to determine:—

1. What the cause of this phenomenon is and under what conditions it occurs.

2. In what cases and by what means it is possible to utilize said phenomenon for obtaining rapid and valuable reactions between slag and metal, that is, reactions leading to the production of steels having a low content of oxygen, and which have been notably enriched in silicon during the operation, to such extent that the ingots are calmed in the moulds without any, or with a very small, killing addition.

The applicant has established by successive experiments:

1. That there was no relation between the production of this gaseous evolution and the final oxygen content of the steel; there could not therefore be concerned a phenomenon of gas evolution coextensive with the deoxidation, 2. That with the same slag rich in silica, heated to the same temperature, the phenomenon appeared only when the content of carbon in the steel exceeded a certain figure and that this phenomenon became more and more violent as the carbon increased above this figure.

3. That with the same steel having the same content of carbon, the gaseous evolution appeared and was more and more considerable as the content of iron oxide in the slag was progressively increased.

4. That with the same steel and the same slag poor in FeO the seething appeared for certain contents of carbon in the steel, with a strong superheating of the slag in the electric fusion furnace and that the seething was the more considerable as the superheating was greater.

Thus with mild or semi-mild steels ($C \leq 0.30$) and with slags with 50–60% of silica, containing for example 1% of iron oxide, it has been impossible to produce this gaseous evolution even with slags heated in an electric furnace far above the temperature of the steel.

By pouring with great violence the steel upon the molten slag placed at the bottom of a ladle a thorough intermixing of the slag and the steel has been obtained with simultaneous intense deoxidation effects of the steel, leading to residual contents of 0.001 to 0.002% O in the metal without the occurrence of any visible reaction, i. e. of any visible gaseous evolution.

With the same slags and a content of carbon of 1% the phenomenon of gaseous evolution was produced very readily (the slag being at a temperature a little above that of the steel) by pouring without any violence the metal upon the slag.

For steels having a carbon content of 0.3 to 0.5% and for a slag of a given composition no phenomenon of gaseous evolution occurs when the slag is not superheated well above its melting point, while the said phenomenon takes place when the temperature of the slag is strongly elevated.

On the contrary with slags of the same type but more rich in iron oxide, for example, 8–10%, not containing other acid or neutral elements than silica or alumina, the phenomenon mentioned above has been produced even with mild steel and with non-superheated slags.

These facts taken together have led to the very clear conclusion that the gaseous evolution involving violent agitation, which is observed under certain conditions during the pouring of the steel upon slags rich in silica, is due to the evolution of carbon monoxide produced by the reduction of certain elements of the slag by the carbon, that is to say, iron oxide, manganese oxide or silica, elements more readily reducible than lime, magnesia, titanium oxide, alumina, soda and other elements employed in these slags.

Even though the successive differences between contents of carbon analyzed in test pieces removed before or after the operation may be of the order of size of errors of analysis or variations of analysis which are normally observed from one removal to another in the same steel, nevertheless, a real oxidation of the carbon is produced; but a very small quantity of carbon oxidized is sufficient to give a large volume of gas at 1500° C. and thus to produce a strong agitation.

This reduction is of the same nature as that which occurs in the blast furnace when the carbon reduces iron oxide, manganese oxide and silica. For the evolution to be produced it is necessary and sufficient that, by reaction of C upon the slag, there is a formation of CO and that the tension thereof shall exceed the atmospheric pressure. The richer the slag in an oxide of a low heat of formation with respect to $O_2$, the greater will be the gas evolution obtained with a low content of carbon; this is especially the case with iron oxide.

The higher the temperature of the slag as well as of the metal—though it is not desired to superheat the metal—and the more on the one hand the endothermic reaction of reduction by the carbon will thus be favored, the more on the other hand will the silicates of the slag be dissociated. This increases for the same composition of slags the content of free oxides and favors consequently the reaction which obeys the law of mass action:

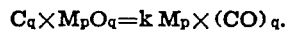

$$C_q \times M_p O_q = k\, M_p \times (CO)_q.$$

The facts observed are thus in entire conformity with what might have been expected.

Having thus ascertained the reason of the said phenomenon, the applicant has studied the possibility and conditions of using it, for obtaining steels which, after they have reacted with the slag, have a low content of oxygen and a content of introduced silicon such that the steel is practically calmed in the moulds or can be killed with very small addition.

As has been indicated above, the C may be oxidized at the expense of FeO, MnO or $SiO_2$. The Mn is oxidized at the same time as the C at the expense of FeO or $SiO_2$ if the proportion of MnO is not high in the slag and is, for example, lower than 20%.

In the case of mild or semi-mild steels, the gaseous evolution cannot be practically obtained other than with slags containing non negligible quantities of FeO, for example 8% (for slags not containing $TiO_2$) but it is observed in this case that the oxidation of the C and of the Mn is produced at the expense of the FeO of the slag. In that case, there is no enrichment in Si of the metal discernible to analysis whereas there is a loss of manganese without corresponding introduction of Si. This proves that the Mn like the carbon has been oxidized by FeO, that there has thus been oxidation of the elements of the steel by FeO of the slag which cannot but lead to an oxidation of the steel. In fact the steel so produced showed a high content of oxygen.

In order that there may be a useful effect, the reaction giving rise to the gas CO and at the same time causing the oxidation of the Mn must take place at the expense of the silica. This is shown by an increase of the contents of silicon of the steel and by an enrichment of the slag in the total of MnO and FeO, the iron intervening to produce a reduction of silica.

The applicant has succeeded in employing such conditions and in obtaining important results with steels with a carbon content above 0.300% and with slags poor in iron oxides.

The applicant has observed that for steel with a carbon content between 0.30% and 0.50% it was necessary to superheat the slag above the melting point of the steel, for example, 1600° C.

It has been possible to find evidence in this case of important enrichments of steel in silicon, these enrichments being such that the steel poured into feed head ingots under wood charcoal shrank deeply without any killing addition of Si, Al or Ti. Steels so made showed a very low content of oxygen.

For steels with a content of carbon above 0.500% the superheating need be less and less strong as the carbon content increases and is no longer necessary at all for steels which are really hard steels, e. g. for steels with 0.8 to 1% C.

The steel will be poured so as not to expel the slag out of the ladle, that is to say, not rapidly. It is even found of advantage in the case of hard steels to interrupt from time to time the jet of steel. Thereby the speed of the pouring will be regulated using the reaction of explosive nature to obtain the violent boiling at the points of contact between slag and metal without causing overflowing. The process according to the invention consists thus in using the partial reduction of the silica of the slag by the carbon of carburized steels to produce a gaseous evolution, a violent boiling, and a rapid partial reaction, during which metal is projected upwards into the slag. This presupposes at the same time a sufficiently high carbon content accompanied by a superheating of the slag for average contents and slags poor in iron oxide, otherwise there takes place a reduction without advantage of iron oxide instead of reduction of the silica.

*Example 1*

15 metric tons of steel containing C, 1.365%—Si, 0.010%—Mn, 0.440%, were poured, interrupting the pour from time to time, upon a large quantity of an acid synthetic fused slag, hot and very fluid, rich in silica (56% of $SiO_2$), containing 3% of MnO and very poor in iron oxide, e. g. 0.75%. The seething was intense.

When the operation was finished the steel was poured into ingots. These gave the following analysis:

C, 1.310%—Si, 0.140%—Mn, 0.220%.

The metal was calm without addition. There was thus observed the introduction of 0.130% of Si into the steel.

The oxygen content was 0.004%.

The slag was enriched in MnO and FeO and impoverished in silica. The final contents were: $SiO_2$, 45%—FeO, 2.3%—MnO, 8%.

*Example 2*

Under analogous conditions of operation, a steel containing:

C, 0.630%—Si, 0.010%—Mn, 1.440% was poured into a great quantity of a slag of the composition $SiO_2$, 52%—FeO, 0.73%—MnO, 5%. An intense seething and turbulence was produced. The steel after this treatment had the following analysis:

C, 0.610%, Si, 0.122%—Mn, 0.960%.

The oxygen content was 0.003%.

The slag contained after the operation 43% of $SiO_2$, 2.5% of FeO, 10.5% of MnO.

What I claim is:

1. The process of incorporating silicon into steel which comprises pouring steel into a molten bath of silicious acid slag poor in iron oxide, the carbon content of the steel and the temperature of the slag being both sufficiently high and the iron oxide content of the slag being sufficiently low, so that the carbon of the steel reduces silicon from the silica of the slag with the evolution of carbon monoxide gas, the temperature of the slag being however inversely so correlated to the carbon content of the steel that the evolution of carbon monoxide gas is controlled to produce a boiling sufficiently intense to intermingle the slag and steel and thereby expedite the reduction of the silica of the slag by the carbon of the steel but not so violent as to project the slag and metal out of the container.

2. The process of incorporating silicon into steel which comprises pouring steel containing at least about 0.3% carbon into a molten bath of silicious acid slag poor in iron oxide, the carbon content of the steel and the temperature of the slag being both sufficiently high and the iron oxide content of the slag being sufficiently low so that the carbon of the steel reduces silicon from the silica of the slag with the evolution of carbon monoxide gas, the temperature of the slag being however inversely so correlated to the carbon content of the steel that the evolution of carbon monoxide gas is controlled to produce a boiling sufficiently intense to intermingle the slag and steel and thereby expedite the reduction of the silica of the slag by the carbon of the steel but not so violent as to project the slag and metal out of the container.

RENÉ PERRIN.